(12) United States Patent
Rubio et al.

(10) Patent No.: US 8,380,119 B2
(45) Date of Patent: *Feb. 19, 2013

(54) GESTURE-RELATED FEEDBACK IN ELETRONIC ENTERTAINMENT SYSTEM

(75) Inventors: Vasco Rubio, Edmonds, WA (US); Eric Filer, Renton, WA (US); Loren Douglas Reas, Kent, WA (US); Dennis W. Tom, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1218 days.

This patent is subject to a terminal disclaimer.

(21) Appl. No.: 12/121,240

(22) Filed: May 15, 2008

(65) Prior Publication Data

US 2009/0286601 A1    Nov. 19, 2009

(51) Int. Cl.
*G09B 5/00* (2006.01)
*A63F 9/24* (2006.01)
*G09G 5/00* (2006.01)

(52) U.S. Cl. ........... 434/307 A; 434/308; 436/7; 436/37; 345/156; 381/56

(58) Field of Classification Search .................. 434/247, 434/307 A, 308, 167; 463/1, 7, 37; 345/156, 345/161, 173–175; 381/56–59, 61, 124
See application file for complete search history.

(56) References Cited

U.S. PATENT DOCUMENTS

| 5,422,956 | A | 6/1995 | Wheaton |
| 5,785,403 | A | 7/1998 | Chang |
| 5,860,023 | A | 1/1999 | Tognazzini |
| 5,885,085 | A | 3/1999 | Fujita |
| 6,183,365 | B1 * | 2/2001 | Tonomura et al. ............. 463/36 |
| 6,514,083 | B1 * | 2/2003 | Kumar et al. ............. 434/307 A |
| 6,554,706 | B2 * | 4/2003 | Kim et al. ........................ 463/36 |
| 6,692,259 | B2 | 2/2004 | Kumar et al. |
| 7,000,200 | B1 * | 2/2006 | Martins .......................... 715/863 |
| 7,135,637 | B2 * | 11/2006 | Nishitani et al. ................ 84/723 |
| 7,145,454 | B2 * | 12/2006 | Linjama et al. ............... 340/540 |
| 7,164,076 | B2 * | 1/2007 | McHale et al. ................. 84/616 |

(Continued)

FOREIGN PATENT DOCUMENTS

| CN | 1930897 A | 3/2007 |
| JP | 2004061968 A | 2/2004 |

(Continued)

OTHER PUBLICATIONS

Michaud, et al., "Mobile Robots Engaging Children in Learning", 2007, American Association for Artificial Intelligence (AAAI), pp. 4.

(Continued)

*Primary Examiner* — Kang Hu
(74) *Attorney, Agent, or Firm* — Alleman Hall McCoy Russell & Tuttle LLP

(57) ABSTRACT

Various embodiments related to providing user feedback in an electronic entertainment system are disclosed herein. For example, one disclosed embodiment provides a method of providing user feedback in a karaoke system, comprising inviting a microphone gesture input from a user, receiving the microphone gesture input from the user via one or more motion sensors located on a microphone, comparing the microphone gesture input to an expected gesture input, rating the microphone gesture input based upon comparing the microphone gesture input to the expected gesture input, and providing feedback to the user based upon the rating.

17 Claims, 4 Drawing Sheets

U.S. PATENT DOCUMENTS

| | | | |
|---|---|---|---|
| 7,179,984 B2 * | 2/2007 | Nishitani et al. | 84/723 |
| 7,317,872 B1 | 1/2008 | Posa et al. | |
| 7,728,822 B2 * | 6/2010 | Shiga | 345/173 |
| 2003/0167908 A1 | 9/2003 | Nishitani et al. | |
| 2004/0127285 A1 | 7/2004 | Kavana | |
| 2005/0047069 A1 | 3/2005 | Chu | |
| 2007/0021205 A1 | 1/2007 | Filer | |
| 2007/0256541 A1 | 11/2007 | McCauley | |
| 2009/0023123 A1 * | 1/2009 | Seo | 434/307 A |

FOREIGN PATENT DOCUMENTS

| | | |
|---|---|---|
| KR | 1020060099483 A | 9/2006 |

OTHER PUBLICATIONS

Schiesser, et al., "On making and playing an electronically-augmented saxophone", Proceedings of the 2006 International Conference on New Interfaces for Musical Expression (NIME06), 2006, pp. 308-313.

ISA Korea, International Search Report of PCT/US2009/040865, Dec. 23, 2009, 3 pages.

Partial Translation of Notice of the First Office Action of Chinese Patent Application No. 200980117810.2, Oct. 9, 2012, 18 pages, State Intellectual Property Office of the People's Republic of China.

* cited by examiner

GESTURE-RELATED FEEDBACK IN ELETRONIC ENTERTAINMENT SYSTEM

BACKGROUND

Electronic entertainment systems, such as video games, generally provide user feedback in a number of different forms. For example, a score or other such performance metric may be displayed to give the user feedback regarding how well the user played the game. This may provide a basis for the user to track improvements in skill, and to compare the user's skill to the skill of other players.

However, other entertainment systems may not be configured to offer such feedback to a user. For example, karaoke systems may be configured to prompt a user to sing into a microphone along with a song (for example, via lyrics displayed on a display), and then to amplify and output the user's singing for an audience to hear. In such systems, feedback on the quality of a performance may provided by the audience (for example, via cheering or booing), rather than the entertainment system.

SUMMARY

Various embodiments related to providing user feedback in an electronic entertainment system are disclosed herein. For example, one disclosed embodiment provides a method of providing user feedback in a karaoke system, comprising inviting a microphone gesture input from a user, receiving the microphone gesture input from the user via one or more motion sensors located on the microphone, comparing the microphone gesture input to an expected gesture input, rating the microphone gesture input based upon comparing the microphone gesture input to the expected gesture input, and providing feedback to the user based upon the rating.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
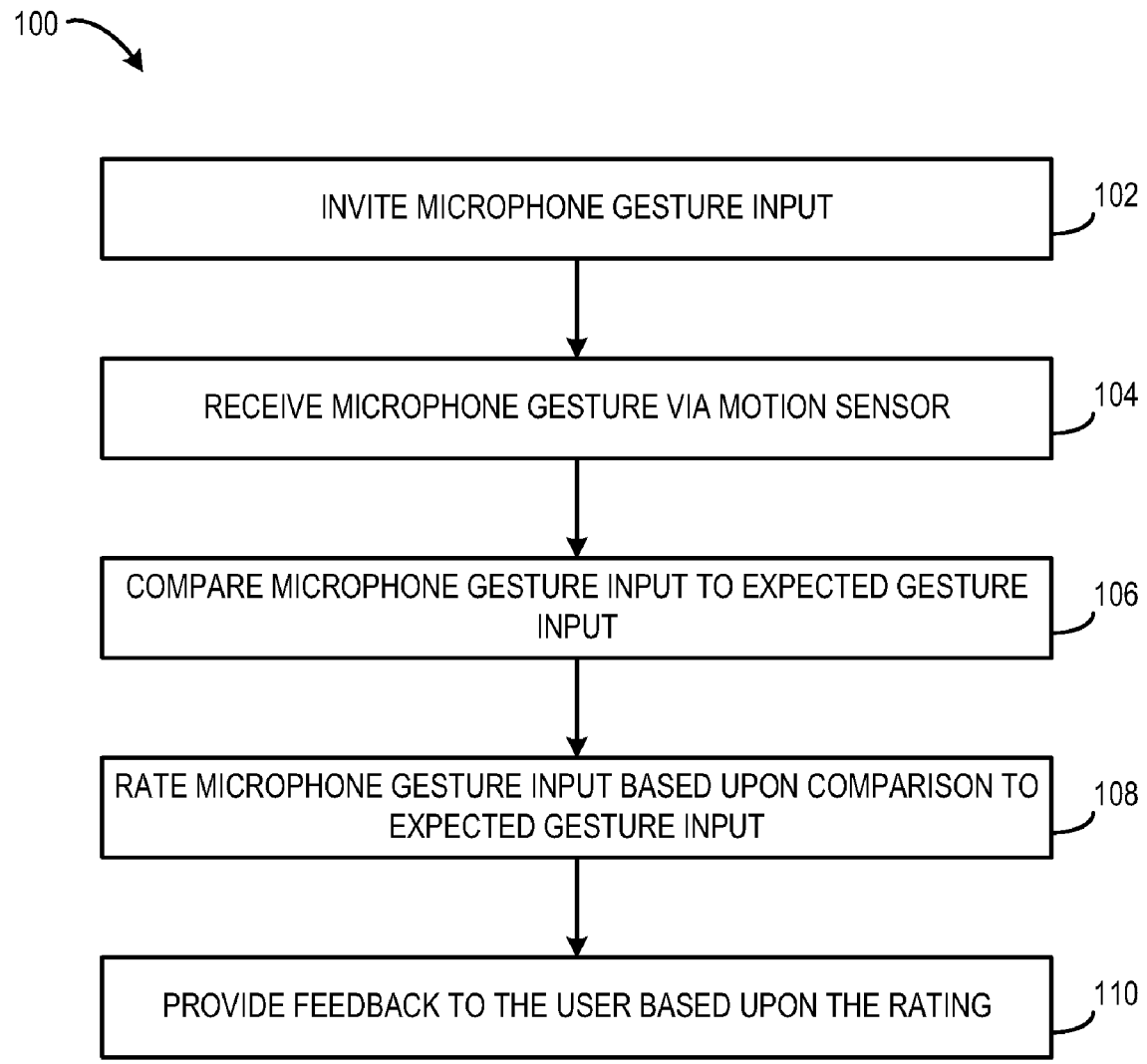
FIG. 1 shows a process flow depicting an embodiment of a method for providing user feedback in a karaoke system.

FIG. 1 shows an embodiment of a method 100 for providing user feedback in a karaoke system. Generally, method 100 is performed with a microphone that comprises one or more motion sensors configured to detect movements of the microphone. Method 100 comprises, at 102, inviting a microphone gesture input, and then at 104, receiving the microphone gesture input from the user via the motion sensor or sensors on the microphone. Next, at 106, method 100 comprises comparing the microphone gesture input received to an expected gesture input, and then, at 108, assigning a rating to the gesture input based upon the comparison to the expected gesture input. Then, at 110, method 100 comprises providing feedback to the user based upon the rating. Method 100 thereby may permit a user's performance to be measured against prior performances by the user and/or other user's performances. This may enable various interactive games and activities to be played with the microphone.

It will be understood that the term "karaoke" is used herein to describe any activity in which a user is prompted to follow a pre-recorded performance, which may be presented via audio, video, or audio/video playback. Karaoke activities generally comprise singing along with a pre-recorded audio track. However, in some embodiments, a user may be prompted to perform microphone gestures that are not accompanied by vocal inputs, for either a portion of a song or an entire song. It will therefore be understood that the term "karaoke" as used herein encompasses audio performances, as well as prompted microphone gestures not accompanied by an audio input. Further, while disclosed herein in the context of a karaoke system, it will be understood that the disclosed embodiments may be implemented in any other suitable entertainment system.

Continuing with FIG. 1, a user may be invited to make a gesture input in any suitable manner. For example, an embodiment of an interactive karaoke activity may involve watching a video playback of a performer singing a song, and then imitating the gestures made by the performer, in addition to singing along with the song. In this embodiment, the user is invited to make the gesture input via the video playback. In another embodiment, a game may involve moving or dancing to the beat of the music being played while singing. In this embodiment, the user is invited to make the gesture input by the rhythm of the song. It will be understood that these embodiments are described for the purpose of example, and that other embodiments are not so limited.

The microphone gesture input may be compared to an expected gesture input in any suitable manner. For example, in some embodiments, a set of recognized gestures may be defined in terms of expected inputs from the motion sensor or sensors on the microphone. Further, a series of recognized gestures may be associated with a specific karaoke song selection. As the user performs the selection, the inputs from the motion sensor or motion sensors on the microphone may be received and compared to the expected inputs. A statistical determination of the deviation of the actual input from the expected input may then be calculated. A rating then may be assigned based upon the magnitude of this deviation. It will be understood that this example is described for the purpose of illustration, and is not intended to be limiting in any manner, as any other suitable method of comparing a microphone gesture input to an expected gesture input may be used.

Additionally, it will be understood that the term "rating" as used herein refers to any value, values, instructions, etc. that represent a result of the comparison of the microphone gesture input against the expected gesture input and that can be used as a basis for providing user feedback.

The comparison of the microphone gesture input to the expected input may be performed via a local controller located on the microphone, or may be sent to another computing device, such as a game console, that executes and controls the electronic interactive entertainment item in use. Where the user input is sent to such an entertainment controller, the input may be sent wirelessly, or via a cable that connects the hand-held remote input device to the entertainment controller. The term "entertainment controller" may be used broadly herein to describe any computing device configured to control the presentation of a karaoke performance or other interactive entertainment activity utilizing a motion-sensitive microphone. Further, the terms "computing device", "computer" and the like used herein include any device that electronically executes one or more programs, including but not limited to game consoles, personal computers, servers, laptop computers, hand-held devices, cellular phones, microprocessor-based programmable consumer electronics and/or appliances, computer networking devices, etc.

Continuing with FIG. 1, the feedback provided to the user based upon the rating may take any suitable form. For example, visual feedback may be provided on a display screen to indicate to a user how closely the gesture performed by the user matches the expected gesture. Likewise, audio feedback may be provided in the form of simulated cheering when the microphone gesture closely matches the expected gesture.

Further, the microphone may comprise one or more light sources configured to output light in a manner based upon the comparison of the input microphone gesture to the expected gesture. For example, light could change color depending upon how closely the user input matches the expected input. In one specific example embodiment, light of one color may represent a good vocal and/or gesture performance while light of another color may represent a poor vocal and/or gesture performance. Depending upon how closely the user's vocal and/or gesture performance matches the expected performance, the light output by the microphone may change, either abruptly or along a continuum, between the two colors, or even between more than two colors that reflect relative performance ratings, by adjusting a relative intensity of a first color and a second color. It will be understood that this embodiment is described for the purpose of example, and is not intended to be limiting in any manner.

Figure 2:
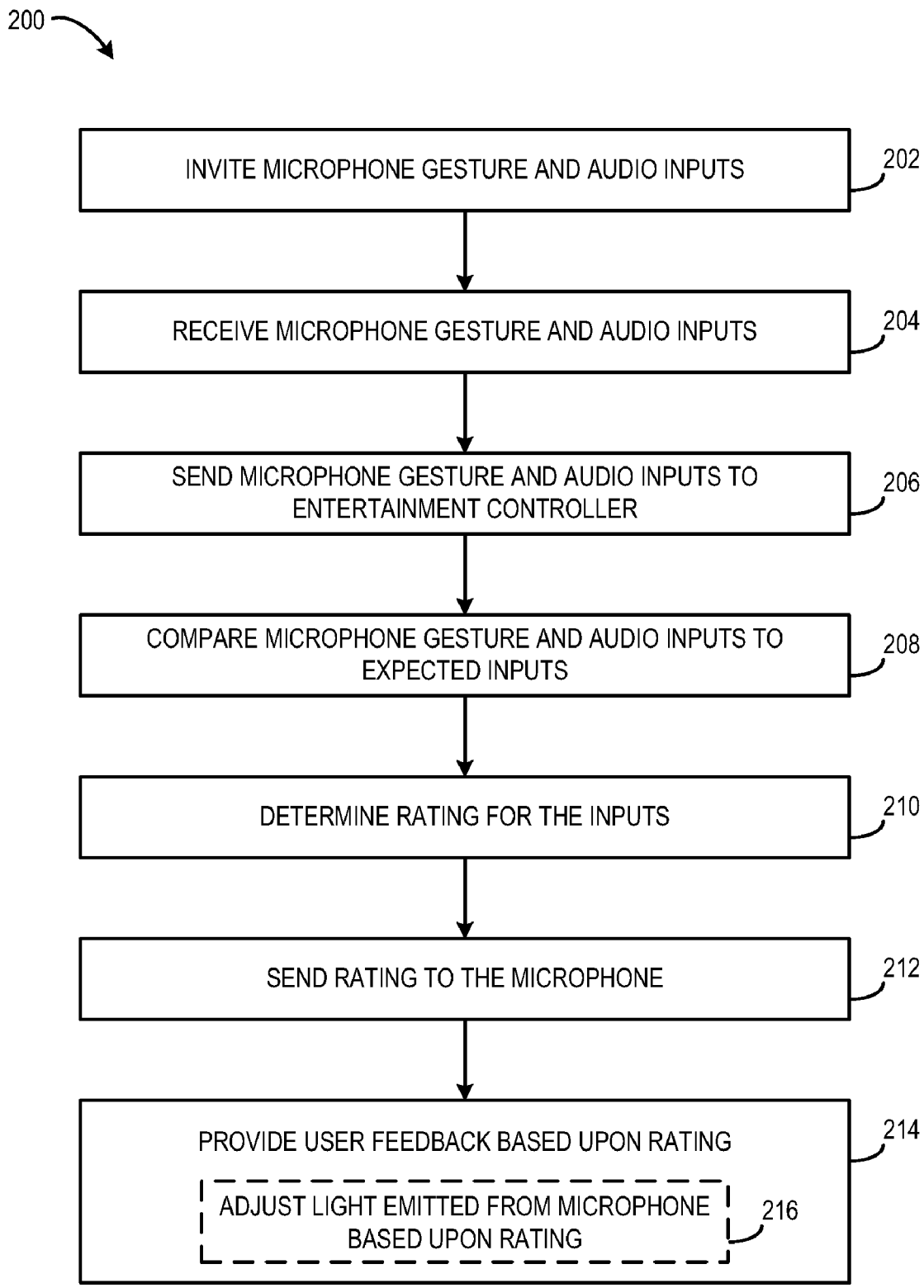
FIG. 2 shows a process flow depicting another embodiment of a method for providing user feedback in a karaoke system.

FIG. 2 illustrates another embodiment of a method 200 providing feedback to a user of a karaoke game in which both audio and gesture inputs are used in providing feedback. Method 200 comprises, at 202, inviting an audio input and a microphone gesture input from a user, and then, at 204, receiving the audio input and the microphone gesture inputs. Inviting an audio input may comprise, for example, outputting an audio version of a song familiar to the user, and also may comprise displaying lyrics for the song on a video display. Likewise, inviting a microphone gesture input may, for example, comprise displaying a gesture on a display for imitation by a user (for example, by playing a music video that shows a performer making a gesture while singing the song), and/or by playing a song to invite the user to move the microphone with the rhythm of the song while singing.

Next, method 200 comprises, at 206, sending the microphone and audio inputs received from the user to an entertainment controller located remotely from the microphone. The input may be sent to the entertainment controller via a wireless link or via a cable connecting the microphone to the entertainment controller. Further, the input may be sent at any suitable interval and/or upon the detection of any suitable triggering event. In one example embodiment, a steady stream of data from the motion sensor is sent to the entertainment controller. In one more specific example, ten bits of data for each axis of a three-axis accelerometer is periodically sent to the entertainment controller at a regular interval, e.g. every 8-10 ms. It will be understood that motion data may be sent in any other suitable interval, and that this specific example is not intended to be limiting in any manner.

Method 200 next comprises comparing, at 208, the microphone gesture input and audio input received from the user to expected gesture and audio inputs. Any suitable characteristic or characteristics of the audio input received from the user may be compared to the expected audio input. For example, an instantaneous or averaged pitch of the user input may be compared to an expected instantaneous or averaged pitch. Further, a rhythm, a timing, or a change in intensity (i.e. crescendo or diminuendo), of the user input may be compared to an expected rhythm, an expected timing, or expected intensity change. Further, voice recognition techniques may be used to compare a lyrical input received to an expected lyrical input.

Next, method 200 comprises, at 210, determining a rating for the audio and gesture inputs based upon the comparison of the inputs received to the expected inputs. The rating may comprise any suitable value, values, instructions, or other output that is configured to cause the karaoke system to provide suitable user feedback. For example, the rating may represent a comparison of a single characteristic of the user input (such as pitch or tone of a vocal input) along with the gesture input to a single characteristic of the expected input along with the expected gesture input. In other embodiments, the rating may represent a combination of factors in the vocal input (e.g. combinations of pitch, rhythm, and/or relative intensity of a vocal input), along with the gesture input. It will be understood that the rating may be calculated in any suitable manner from these inputs, including but not limited to various statistical methods.

Continuing, method 200 next comprises, at 212, sending the rating to the microphone, and then at 214, providing feedback to the user based upon the rating. Any suitable feedback may be provided. For example, a score corresponding to the rating may be displayed on a display. Likewise, a simulated audio playback of a cheering audience may be varied depending upon the rating. Further, light emitted by the microphone may be adjusted in response to the rating, as indicated at 216. The rating may be sent to the microphone in any suitable manner, including via a wireless connection and/or via a cable connecting the microphone to the entertainment controller. Likewise, where feedback is provided in the form of light emitted by the microphone, the light may be adjusted in any suitable manner. For example, relative intensities of a first color of light and a second color of light may be adjusted. Alternatively or additionally, any other suitable adjustment may be made. In this manner, a user of the microphone, as well as any audience members, are presented with visual feedback that is related to the relative closeness of the user's audio and/or gesture performance to an expected performance. It will be understood that the specific example of a karaoke system is described for the purpose of example, and that other embodiments are not so limited.

Figure 3:
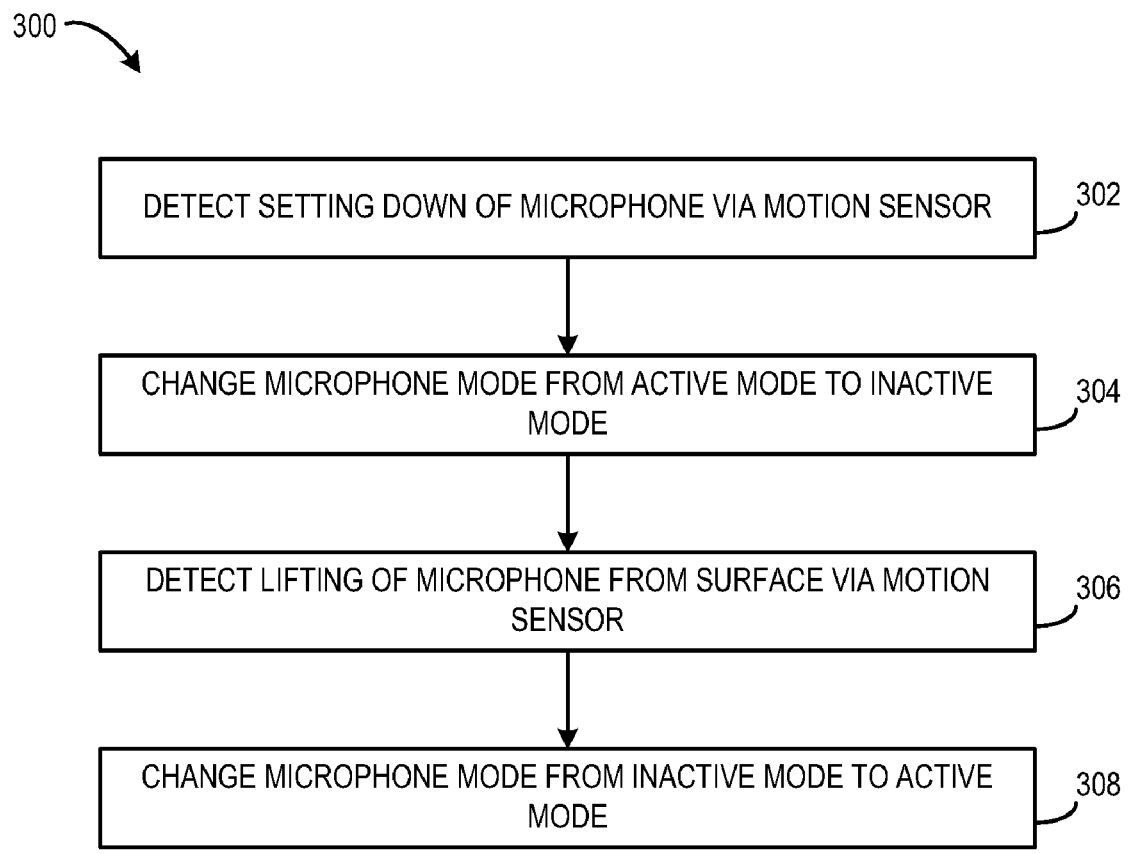
FIG. 3 shows a process flow depicting an embodiment of a method of controlling an operating mode of a microphone as a function of a detected motion of the microphone.

Information from the motion sensor(s) within the microphone may be used in other manners besides to provide feedback during a karaoke performance or while playing various games. For example, information from the motion sensor(s) may be used to detect various user actions and automatically perform operating mode changes in response. FIG. 3 illustrates one embodiment of such an automatically performed mode change, in the form of a method 300 of automatically changing the microphone between an operating mode and an inactive mode based upon a user action.

Method 300 comprises, at 302, detecting a setting down of the microphone on a surface. Such a gesture may be detected in any suitable manner. For example, such a gesture may be detected by a more abrupt change in microphone velocity than that expected during use, and/or by a tilting of the microphone to a rest position (e.g. generally horizontal with reference to a long axis of a cylindrical microphone) followed by a period of no movement. In response to such an output from the motion sensor(s), method 300 comprises, at 304, changing an operating mode of the microphone from an active mode to an inactive mode. This may provide various advantages. For example, in the case of a wireless microphone, this may help preserve battery charge, and therefore allow a longer time to pass between rechargings. It will be understood that the term "active mode" refers to a microphone operating mode used during ordinary microphone use, and "inactive mode" may include any mode with lower power consumption and/or reduced functionality than the active mode.

Method 300 further comprises, at 306, detecting a lifting of the microphone from the surface via the motion sensor. Such a gesture may be detected in any suitable manner. For example, such a gesture may be detected by a resumption of detected motion after a period of no movement, and/or by a tilting of the microphone from a rest position to a more upright position. In response to such an output from the motion sensor(s), method 300 comprises, at 304, changing an operating mode of the microphone from an inactive mode to an active mode. It will be understood that the gestures disclosed herein for changing the microphone between active and inactive modes are set forth for the purpose of example, and that any other suitable gesture may be used.

Figure 4:
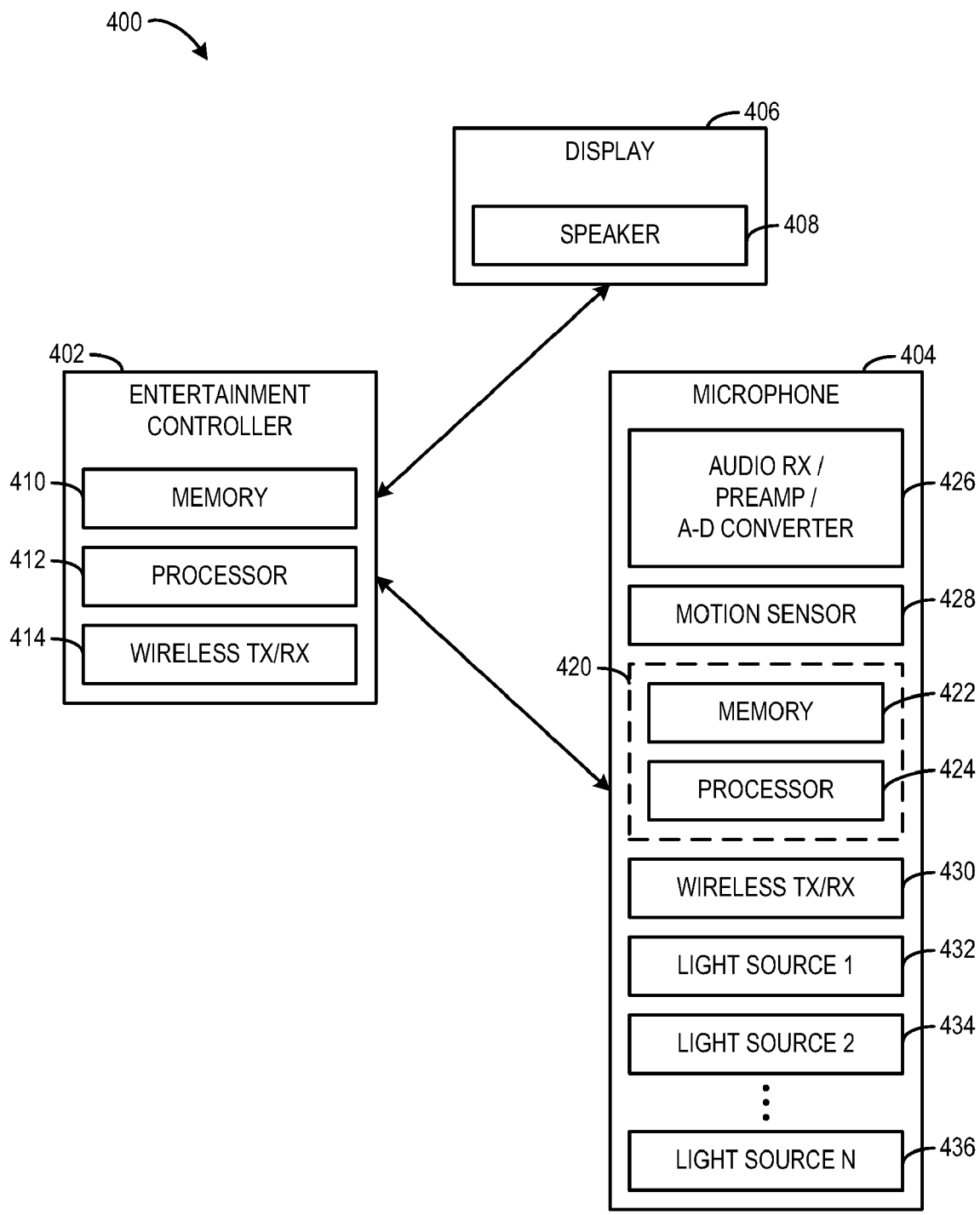
FIG. 4 shows an embodiment of a karaoke system.

FIG. 4 shows an embodiment of an electronic entertainment system in the form of a karaoke system 400. Karaoke system 400 comprises an entertainment controller 402 in communication with a microphone 404, and with a display system 406. Entertainment controller 402 comprises various components, including but not limited to memory 410, a processor 412, and a wireless transmitter/receiver 414. Entertainment controller 402 is configured to control a presentation of a karaoke activity. As such, the entertainment controller 402 may be configured to control the display of lyrics and/or a music video for a karaoke selection on the display system 406, to control the playback of an audio portion of the karaoke selection via one or more speakers 408 on the display system (or via other speakers), etc. It will be understood that the entertainment controller 402 may communicate with the microphone 404 and the display system 406 wirelessly and/or via one or more cables or the like connecting the devices. Further, it will be appreciated that the entertainment controller, microphone 404 and display system 406 may be connected directly to one another, or may communicate over a network.

The entertainment controller 402 may be configured to communicate with the microphone 404, for example, to receive a user input sent by the microphone 404 or other user input device, to compare the user input to an expected input, to assign a rating based upon the input, and to send the ratings to the microphone 404. In other embodiments, the microphone 404 may be configured to perform the comparison and rating assignment locally.

The entertainment controller 402 may comprise programs or code stored in memory 410 and executable by the processor 412 to enable the performance of such functions. Generally, programs include routines, objects, components, data structures, and the like that perform particular tasks or implement particular abstract data types. The term "program" as used herein may connote a single program or multiple programs acting in concert, and may be used to denote applications, services, or any other type or class of program.

Continuing with FIG. 4, the microphone 404 comprises a microphone controller 420 with memory 422 and a processor 424. The microphone 404 also comprises an audio input 426 configured to receive a vocal input from a user. The audio input 426 may include components such as an audio transducer, a preamp or other amplification stages, an analog-to-digital converter, and/or any other suitable components. The microphone 404 may further comprise one or more motion sensors 428 configured to detect a user gesture, and to provide a signal based upon the gesture to the microphone controller 420 as a gesture input. Any suitable motion sensor may be used. Examples of suitable motion sensors include, but are not limited to, three-axis accelerometers.

The microphone 404 further comprises a wireless receiver/transmitter 430 to enable the microphone to communicate wirelessly with the entertainment controller 402. In other embodiments, the microphone 404 may be configured to communicate with the entertainment controller 402 via a cable that connects the microphone 404 to the entertainment controller 402.

In some embodiments, the microphone 404 may further comprise a plurality of light sources, shown as light source 1, light source 2, and light source n at 432, 434, and 436, respectively. Each light source may comprise any suitable components, including but not limited to light bulbs, LEDs, lasers, as well as various optical components to direct light to outlets located at desired locations on the microphone casing. While shown as having n plural light sources, it will be understood that the microphone 404 may have any suitable number of light sources, including a single light source in some embodiments. Further, other embodiments may not include such light sources.

The microphone controller 420 may comprise code stored in memory 422 that is executable by the processor 424 to receive inputs from the various inputs described above, and to send such inputs to the entertainment controller. Further, in some embodiments, the microphone may be configured to receive ratings and other communications from the entertainment controller, and to control the output of one or more light sources based upon the rating. Further, as described above, the microphone controller 420 may comprise code executable to compare the user input to the expected input and to assign a rating to the user input based upon this comparison. In such embodiments, it will be understood that the comparison and ratings processes may be performed either fully on the microphone controller 420, or may be shared with the entertainment controller 402 such that the entertainment controller 402 and microphone controller 404 each analyzes a portion of the user input made. For example, the entertainment controller 402 may be configured to analyze tone, pitch, rhythm, timing, etc., while the microphone controller 420 may be configured to analyze the volume/intensity of the input. It will be understood that this specific embodiment is described for the purpose of example, and that other embodiments are not so limited.

While described herein in the context of a karaoke system, it will be understood that the concepts disclosed herein may be used in any other suitable environment, including but not limited to video game systems that utilize hand-held remote input devices. It will further be appreciated that the configurations and/or approaches described herein are exemplary in nature, and that these specific embodiments or examples are not to be considered in a limiting sense, because numerous variations are possible. The specific routines or methods described herein may represent one or more of any number of processing strategies such as event-driven, interrupt-driven, multi-tasking, multi-threading, and the like. As such, various acts illustrated may be performed in the sequence illustrated, in parallel, or in some cases omitted. Likewise, the order of any of the above-described processes is not necessarily required to achieve the features and/or results of the embodiments described herein, but is provided for ease of illustration and description. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of providing user feedback in a karaoke system, the karaoke system comprising a microphone with one or more motion sensors, the karaoke system also comprising an entertainment controller in communication with the microphone, the method comprising:
   inviting a microphone gesture input from a user;
   receiving the microphone gesture input from the user via the one or more motion sensors;
   receiving an audio input from the user;
   comparing the microphone gesture input and the audio input to an expected gesture input and an expected audio input;
   determining a rating for a user performance based upon comparing the microphone gesture input to the expected gesture input and the audio input to the expected audio input; and
   providing feedback to the user based upon the rating.

2. The method of claim 1, wherein inviting a microphone gesture input comprises displaying on a display a gesture to be imitated by the user.

3. The method of claim 1, further comprising detecting a setting down of the microphone on a surface via the one or more motion sensors, and then changing a mode of the microphone from an operating mode to an inactive mode.

4. The method of claim 3, further comprising detecting a lifting of the microphone from the surface, and then changing the mode of the microphone from the inactive mode to the operating mode.

5. The method of claim 1, further comprising sending the microphone gesture input to the entertainment controller for comparing to the expected gesture input.

6. The method of claim 5, wherein sending the microphone gesture input comprises sending data periodically from the one or more motion sensors to the entertainment controller.

7. A method of providing feedback to a karaoke user, comprising:
   inviting a user to imitate an expected gesture input by performing a microphone gesture input;
   receiving the microphone gesture input from the user via a microphone that comprises an audio receiver and one or more motion sensors;
   receiving an audio input from the user;
   sending the microphone gesture input and the audio input from the microphone to an entertainment controller;
   at the entertainment controller, comparing the microphone gesture input from the microphone to the expected gesture input and the audio input to an expected audio input;
   determining a rating for a user performance based upon comparing the microphone gesture input to the expected gesture input and comparing the audio input to the expected audio input; and
   sending the rating to the microphone.

8. The method of claim 7, wherein inviting a microphone gesture input comprises displaying on a display the expected gesture input to be imitated by the user.

9. The method of claim 7, further comprising detecting a setting down of the microphone onto a surface via the one or more motion sensors, and then changing a mode of the microphone from an operating mode to an inactive mode.

10. The method of claim 9, further comprising detecting a lifting of the microphone from the surface, and then changing the mode of the microphone from the inactive mode to the operating mode.

11. The method of claim 7, wherein sending the microphone gesture input comprises sending a stream of periodic data from the one or more motion sensors.

12. A karaoke system, comprising:
   an entertainment controller configured to control a presentation of a karaoke audio/video selection to a user;
   a hand-held wireless microphone in communication with the entertainment controller and comprising an audio receiver and one or more motion sensors;
   code stored on the entertainment controller and executable to receive a gesture input and a vocal input sent by the microphone, to assign a rating to a user performance based upon a comparison of the gesture input and the vocal input to an expected gesture input and expected vocal input, and to send the rating to the microphone; and
   code stored on the microphone and executable to receive the gesture input and the vocal input, to send the gesture input and the vocal input to the entertainment controller, and to provide user feedback based upon the rating.

13. The karaoke system of claim 12, wherein the one or more motion sensors comprises a three-axis accelerometer.

14. The karaoke system of claim 12, wherein the microphone further comprises one or more light sources, and further comprising code stored on one or more of the microphone and the entertainment controller and executable to provide user feedback via the one or more light sources.

15. The karaoke system of claim 12, wherein the entertainment controller is configured to be connected to a display, and further comprising code stored on the entertainment controller and executable to display on the display a gesture to be imitated by the user.

16. The karaoke system of claim 12, further comprising code executable to detect a setting down of the microphone on a surface via the one or more motion sensors, and then to change a mode of the microphone from an operating mode to an inactive mode.

17. The karaoke system of claim 12, wherein the code executable to send the gesture input and the vocal input to the entertainment controller comprises code executable to periodically send data from the one or more motion sensors to the entertainment controller.

* * * * *